United States Patent [19]
Rathbone

[11] Patent Number: 5,317,862
[45] Date of Patent: Jun. 7, 1994

[54] AIR SEPARATION

[75] Inventor: Thomas Rathbone, Farnham, England

[73] Assignee: The BOC Group, plc, Surrey, England

[21] Appl. No.: 43,317

[22] Filed: Apr. 6, 1993

[30] Foreign Application Priority Data

Apr. 22, 1992 [GB] United Kingdom ............... 9208647

[51] Int. Cl.$^5$ .................................................. F02G 3/00
[52] U.S. Cl. ................................ 60/39.05; 60/39.53; 60/39.54; 60/39.59; 62/39; 75/466; 75/958; 266/155; 266/160
[58] Field of Search ............... 60/39.05, 39.53, 39.54, 60/39.59; 62/30, 39; 75/466, 958; 266/155, 160

[56] References Cited

U.S. PATENT DOCUMENTS

| | | | |
|---|---|---|---|
| 4,019,314 | 4/1977 | Springmann | 60/39.12 |
| 4,075,831 | 2/1978 | McGann | 60/39.59 |
| 4,224,045 | 9/1980 | Olszewski et al. | 62/30 |
| 4,382,366 | 5/1983 | Gaumer | 62/39 |
| 4,557,735 | 12/1985 | Pike | 62/18 |
| 4,631,915 | 12/1986 | Frewer et al. | 60/39.12 |
| 4,667,467 | 5/1987 | Archer et al. | 60/39.12 |
| 4,729,217 | 3/1988 | Kehlhofer | 60/39.12 |
| 4,806,136 | 2/1989 | Kiersz et al. | 62/18 |
| 5,080,703 | 1/1992 | Rathbone | 60/39.12 |
| 5,081,845 | 1/1992 | Allam et al. | 60/39.12 |

FOREIGN PATENT DOCUMENTS

| | | |
|---|---|---|
| 0384688 | 8/1990 | European Pat. Off. . |
| 0503900 | 9/1992 | European Pat. Off. . |
| 2261225 | 5/1993 | United Kingdom . |

*Primary Examiner*—Richard A. Bertsch
*Assistant Examiner*—Howard R. Richman
*Attorney, Agent, or Firm*—David M. Rosenblum; Larry R. Cassett

[57] ABSTRACT

In a process integration, particularly with a blast furnace, nitrogen under pressure is moisturized by the addition to it of hot, pressurized water. The moisturized nitrogen is expanded and power thereby generated. The nitrogen is not mixed with combustion gases. Improved heat balance and work recovery are achieved.

22 Claims, 2 Drawing Sheets

AIR SEPARATION

BACKGROUND OF THE INVENTION

This invention relates to air separation and in particular to an integrated method of separating air and generating power, and integrated plant for performing such a method.

A gas turbine comprises an air compressor, a combustion chamber and an expander. In operation, air is compressed in the compressor and is used to support combustion of a fuel gas in the combustion chamber. The resulting gaseous combustion products are then expanded in the expander or turbine with the performance of external work. This work may be the generation of electricity. Thus, the gas turbine may form part of a power station with the rotors of the compressor and expander and an alternator all mounted on the same shaft.

Commercial processes for the separation of air first require its compression. It is known to bleed compressed air from the air compressor of a gas turbine to feed an air separation plant. In a conventional air separation process, air is compressed, is purified by the removal of components such as water vapor and carbon dioxide that are less volatile than its main components, cooled to a temperature suitable for its separation by rectification, and then rectified in a so-called double rectification column having a higher pressure and a lower pressure stage. The oxygen product is typically withdrawn from the lower pressure stage as a vapor and warmed to ambient temperature by heat exchange with the incoming air. The lower pressure stage is conventionally operated at a pressure a little above atmospheric pressure so that the oxygen product is obtained at about atmospheric pressure. In some schemes, oxygen product from the air separation plant is used in the generation of the fuel gas that is burned in the combustion chamber of the gas turbine. Such processes typically require the oxygen to be produced at elevated pressure. Although the necessary pressure can be created by compressing the oxygen, U.S. Pat. No. 4,224,045 discloses that there are advantages in terms of the operating efficiency of the air separation process to operate the lower stage of the double rectification column at pressures well above atmospheric pressure. Further, the compressor of a gas turbine typically has an outlet pressure in the order of 10 to 20 atmospheres which is in excess of that required by the air separation process when the oxygen is taken from the lower pressure stage of the double rectification column at a pressure a little above atmospheric. Accordingly, it is typically desirable to operate the higher pressure stage of the double rectification column at substantially the same pressure as the outlet pressure of the compressor of the gas turbine.

Not only is oxygen then produced at a pressure well above atmospheric pressure, so is a nitrogen product. There are a number of proposals in the art including U.S. Pat. No. 4,224,045 for taking a stream of this relatively high pressure nitrogen product, warming it to about ambient temperature by heat exchange with the incoming air to about ambient pressure, further compressing the stream, further raising the temperature of the stream in a second stage of heat exchange with the incoming air so as to remove heat of compression from such air and then introducing the nitrogen into the combustion chamber or expander of the gas turbine. Accordingly, the nitrogen helps to power the gas turbine and therefore compensates for the loss of the air taken for separation from the air compressor of the gas turbine. Other examples of such processes are given in U.S. Pat. No. 4,557,735 and U.S. Pat. No. 4,806,136. One practical example of the above-described method is in the gasification of coal and is discussed in a paper entitled "Air Separation Integration for GCC Plants", by Olson, Jr, Anand and Jahnke, Tenth EPRI Conference on Coal Gasification Power Plants, 16 to 18 October 1991, San Francisco. In the integrated process described in this paper, nitrogen from the air separation plant is saturated with water vapor before being introduced into the turbine. We believe one purpose of this moisturization is to provide additional returning mass to the turbine so as better to compensate for the air from the compressor of the turbine that by-passes the combustion chamber and flows into the air separation plant.

There is increasing interest in using pure oxygen or oxygen-enriched air together with coal in processes which form iron by the reduction of iron ore. It has for example been proposed to inject coal together with oxygen or oxygen-enriched air into the tuyeres of a conventional blast furnace thereby reducing the demand of these processes for coke and hence reducing the need for the operation of coke ovens which are viewed as providing environmentally harmful waste products. See for example a paper entitled "Oxy-coke Injection at Cleveland Ironworks". D A Campell et al, 2nd European Ironmaking Congress, Glasgow, September 1991, pp 233-246. Alternative processes using both oxygen and coal, such as the COREX process, eliminate the need for coke altogether. Such processes produce a fuel gas as a by-product, although the fuel gas does not have as high a calorific value as one produced by the direct gasification of coal. Indeed, current proposals for enhancing the operation of a blast furnace by use of oxygen and coal typically produce a fuel gas by-product having a calorific value of less than 5 MJ/m$^3$. Nonetheless, sufficient fuel gas is generated to make worthwhile its combustion for the generation of power. Thus, the fuel gas can be burned in a combustion chamber of a gas turbine and air taken from the compressor of the gas turbine for separation to form an elevated pressure oxygen product that is introduced into the blast furnace.

There is however a problem in introducing nitrogen into a gas turbine that employs a low calorific value fuel gas in its combustion chamber. The turbine has only a limited capacity for the return of preheated nitrogen and so only a part of the heat in the bleed air stream can be used for heating nitrogen. In addition, current gas turbines generally have fuel gas handling systems not able to handle gas at a temperature above 300° C. Accordingly, it is desirable to keep the temperature of any nitrogen stream introduced into the combustion chamber of the gas turbine at or below 300° C., and therefore a further limit is placed on the transfer of heat to such a nitrogen stream.

There is therefore a need for a method and apparatus which enables integrated air separation-gas turbine technology to be used when the fuel gas supplied to the gas turbine is of low calorific value, its source being for example a blast furnace. The invention aims at providing a method and plant that meet this need.

SUMMARY OF THE INVENTION

In its broadest aspect, the invention provides an integrated method of separating air and generating power, comprising:
i) separating a compressed air stream into oxygen and nitrogen;
ii) heating a pressurized stream of water by heat exchange with a first heat exchange stream;
iii) moisturizing stream of the nitrogen by introducing into it stream of water downstream of the heat exchange of the stream of water with said first heat exchange stream;
iv) heating the moisturizing stream of nitrogen by heat exchange with a second heat exchange stream; and
v) expanding with performance of external work at least part of the moisturized stream without pre-mixing the moisturized stream with combustion gases, the work performed comprising the generation of said power.

The invention also provides integrated plant for separating air and generating power, comprising means for separating air into nitrogen and oxygen; a first heat exchanger for heating a pressurized stream of water; means for moisturizing stream of said nitrogen by introducing into it the heated stream of water; a second heat exchanger for heating the moisturized stream of nitrogen; means downstream of the second heat exchanger for expanding at least part of the heated, moisturized stream of nitrogen with the performance of external work; and power generation means adapted to be driven by the expansion means.

According to a preferred aspect of the present invention there is provided an integrated method of separating air and generating power, comprising:
a) compressing air without removing at least part of the heat of compression thereby generated;
b) dividing the compressed air flow into a major stream and a minor stream;
c) cooling the compressed minor air stream by heat exchange with a pressurized stream of water;
d) separating the minor air stream into oxygen and nitrogen;
e) moisturized stream of nitrogen by introducing into it said pressurized stream of water downstream of the heat exchange between the stream of water and the minor air stream;
f) burning a stream of low grade fuel gas utilizing said major air stream to support its combustion; and
g) expanding with the performance of external work gaseous combustion products evolved from the burning of said fuel gas, the work performed comprising the generation of a part of said power; and
h) expanding wi the performance of external work at least part of the moisturized nitrogen stream separately from the expansion of said combustion products, the work performed comprising the generation of another part of said power.

According to another preferred aspect of the present invention there is provided integrated plant for separating air and generating power, comprising a gas turbine comprising an air compressor, combustion chamber and a first expander wherein the combustion chamber communicates with an outlet from the air compressor and has an inlet for a pressurized stream of low grade fuel gas and the first expander has an inlet communicating with an outlet from the combustion chamber for products of the combustion of the fuel gas; a heat exchanger having a first inlet communicating with an outlet from the air compressor and a second inlet communicating with a source of pressurized water, whereby in operation an air stream withdrawn from the compressor is able to be heat exchanged with a pressurized stream of water; means for separating the heat exchanged air into oxygen and nitrogen; means for moisturized a stream of nitrogen with said heat exchanged, pressurized stream of water; and power generation means adapted to be driven by the gas turbine, and a second expander separate from the first expander for expanding with the performance of external work at least part of the moisturized stream of nitrogen.

By the term "low grade fuel gas" as used herein is meant a fuel gas having a calorific value of less than 12 $MJ/m^3$.

The method and plant according to the invention find particular use when the source of the low grade gaseous fuel stream is a blast furnace. There is an increasing trend in the iron and steel industry to operate blast furnaces with coal (in addition to coke) and with an air blast enriched in oxygen. The resulting gas mixture comprising nitrogen, carbon monoxide, carbon dioxide and hydrogen. The precise composition of this gas depends on a number of factors including the degree of oxygen enrichment. Typically, however, it has a calorific value in the range of 3 to 5 $MJ/m^3$. It is possible to operate the combined power recovery and air separation method according to the invention in conjunction with alternative processes for reducing iron ore to iron that produce a low grade fuel gas as a by-product.

The low grade fuel gas stream is typically produced at a temperature above ambient, laden with particulate contaminants and includes undesirable gaseous constituents such as hydrogen cyanide, carbon oxysulfied and hydrogen sulfide. Processes and apparatuses for removing such contaminants are well known and produce a clean fuel gas at a temperature at or near to ambient. Such a process or processes may if desired be used to treat low grade fuel gas upstream of its introduction into the combustion chamber in accordance with the invention.

The stream of low grade fuel gas is preferably compressed to a pressure in the range of 10 to 25 atmospheres absolute upstream of its introduction into the combustion chamber. The precise pressure selected depends on the operating pressure of the combustion chamber. A compressor or compressors used for this purpose preferably have means associated therewith for removing the heat of compression. A greater efficiency of compression is able to be achieved when the fuel gas compressor or compressors are operated with removal of the heat of compression than when they are not.

The stream of, nitrogen is preferably moisturized with the stream of pressurized water by countercurrent contact of the two streams with one another in a liquid-gas contact column. The column typically includes a packing in order to effect the contact between the liquid and the gas.

If desired, the moisturized stream of nitrogen may be heated intermediate the gas-liquid contact column and the combustion chamber so as to evaporate any droplets of liquid water carried out of the column in entrainment in the nitrogen.

Preferably, the minor stream of air is precooled upstream of its heat exchange with the pressurized stream of water. The precooling is preferably effected by heat exchanging the minor stream of air with at least part of the moisturized stream of nitrogen. Such precooling facilitates complete removal on the heat of compression from the minor air stream and also enables the moisturised stream of nitrogen to be heated to a temperature in the range of 300°–400° C. upstream of its expansion in the second expander. The fuel gas is preferably moisturized upstream of its introduction the combustion chamber of the gas turbine. Such moisturization provides an additional flow of fluid into the first expander thus enabling additional power to be generated and hence compensating at least in part for the diversion of the minor stream of air to an air separation unit. Moisturization is preferably effected by heating a pressurized stream of water and then contacting a compressed stream of the fuel gas with the pressurized stream of water, for example in a countercurrent liquid-gas contact column. This column typically has a packing in order to carry opt the contact between liquid and gaseous phases. The heating of the pressurized stream of water is preferably carried out by heat exchange countercurrently to a stream of fluid at elevated temperature. Such stream may, for example, be taken from gas that has exited the first expander or may alternatively from any other source of hot fluid available on the site of the gas turbine.

In an alternative example of a method according to the invention, the pressurized stream of water used to moisturise the fuel gas is heated by heat exchange with the minor stream of air and the moisturized stream of nitrogen is heated upstream of the second expander by heat exchange with said stream of fluid at elevated temperature.

The streams of nitrogen and fuel gas are preferably each saturated in water vapor at respectively the outlet of the moisturized means and the inlet to the first expander.

The moisturized nitrogen preferably leaves the second expander at a pressure in the range of 1.0 to 1.2 atmospheres absolute.

Oxygen generated by the separation of the air is preferably used in the process which generates the low grade fuel gas. For example, it can be used to enrich the air supply to a blast furnace in oxygen.

The air is preferably separated by being rectified. The rectification of the air is preferably performed in a double column comprising a higher pressure stage and a lower pressure stage. There is preferably a condenser-reboiler associated with the two said stages of the double column so as to provide reboil for the lower pressure stage and reflux for both stages. Typically, the pressure at which the higher pressure stage of the rectification column operates is a little below the outlet pressure of the air compressor of the gas turbine. If there is a condenser-reboiler linking the two stages of the rectification column, the operating pressure of the lower pressure stage depends on that of the higher pressure stage and thus places a limitation on the pressure at which the lower pressure stage can be operated. The lower pressure stage preferably has an operating pressure (at its top) in the range of 3 to 6 atmospheres absolute depending on the operating pressure of the higher pressure column. Operation of the lower pressure stage in this range makes possible more efficient separation of the air than that possible at the more conventional operating pressures in the range of 1 to 2 atmospheres absolute. Moreover, a stream of nitrogen may be moisturized at the pressure from which is taken from the lower pressure rectification column and subjected to the expansion without being compressed intermediate the low pressure column and the second expander.

A hot gaseous stream of combustion products is typically exhausted from the expander of the gas turbine at a temperature in the range of 450° to 550° C. and a pressure in the range of 1.0 to 1.5 atmospheres absolute. It is desirable to recover the heat available in this stream. A part of the exhaust stream from the first expander may as aforesaid be used either to heat a stream of pressurized water employed to moisturized fuel gas or to heat the moisturize stream of nitrogen upstream of its introduction into the second expander. Alternatively or in addition, at least a part of the exhaust stream from the first expander may be used to raise steam. If desired, the steam may be expanded in a further turbine with the performance of external work, for example the generation of electrical power. Alternatively or in addition, an exhaust stream from the expander of the gas turbine may be used to pre-heat air supplied to a blast furnace. Such air is conventionally heated to a temperature of over 1000° C. by passage through stoves which are heated by the combustion of fluid fuel. A part of the fluid fuel may be low grade fuel gas from the blast furnace. By preheating the air, it is possible to make a saving in the fuel that is used to heat the stoves. Either the rate of consumption of high grade fuel can be reduced, thereby offering a direct cost saving, or a reduction may be made in the rate at which low grade fuel gas from the blast furnace is supplied for the purposes of heating the blast air, thereby making possible an increase in the rate at which the low grade fuel gas is supplied to the gas turbine forming part of the plant according to the invention.

Preferably, from 15 to 30% of the air is taken for air separation.

The method according to the present invention is particularly advantageous when operated in association with a blast furnace. It makes possible removal of heat of compression from the minor air stream while at the same time enhancing the amount of power that can be recovered from the stream of nitrogen. It is to be understood that the rate at which a suitable gas turbine can optimally accept nitrogen would be so low that were that nitrogen be used as the sole means of extracting heat from the minor air stream, its resulting temperature would be above that recommended for use in a gas turbine. Can the other hand, performance of the gas turbine is able to be optimized by moisturized the fuel gas.

BRIEF DESCRIPTION OF THE DRAWINGS

Methods and plant according to the invention will now be described by way of example with reference to the accompanying drawings, in which.

Like parts in the respective drawings are indicated by the same reference numerals.

DETAILED DESCRIPTION

Figure 1:
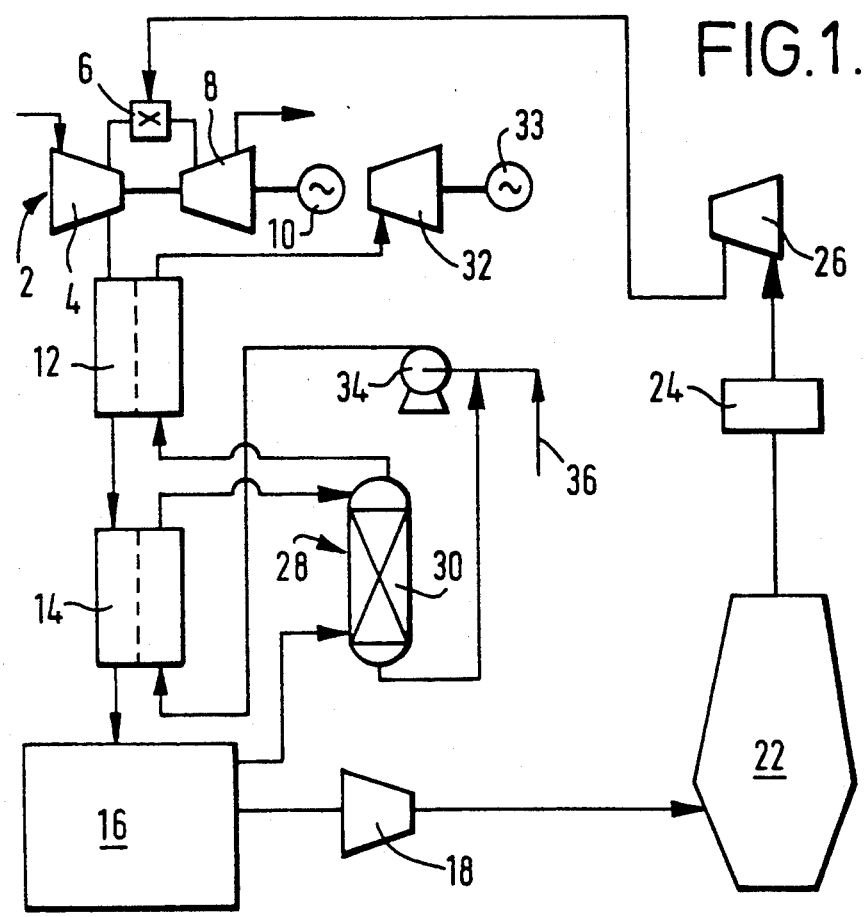
FIG. 1 is a flow diagram illustrating a first integrated plant comprising a blast furnace, a gas turbine and an air separation unit.

Referring to FIG. 1 of the drawings, the illustrated plant includes a gas turbine 2 comprising an air compressor 4, a combustion chamber 6 and an expansion turbine 8. The gas turbine may be a SIEMENS V64.3 60MW gas turbine. The rotor (not shown) of the compressor 4 is mounted on the same shaft as the rotor (not shown) of the turbine 8 and thus the turbine 8 is able to drive the compressor 4. The compressor 4 draws in a flow of air and compresses it to a chosen pressure in the range of 10 to 20 atmospheres absolute. The compressor 4 has no means associated therewith for removing heat of compression. The compressed air thus leaves the compressor 4 at a temperature typically in the order of 400° C. This compressed air stream is divided into a major and a minor stream. Typically, the minor stream comprises from 20 to 35% of the total air flow in the kind of plant illustrated in FIG. 1 of the drawings. The major stream supplied to the combustion chamber 6 is employed to support combustion of a fuel gas also supplied to the combustion chamber 6. The hot stream of combustion gases resulting from the combustion of the fuel gas in the combustion chamber 6 flows into the expansion turbine 8 and is expanded therein to a pressure a little above atmospheric pressure. The expansion turbine 8 as well driving the compressor 4 also drives an alternator 10 which is used in the production of electrical power.

The minor stream of compressed air flows in sequence through a first heat exchanger 12 and a second heat exchanger 14 in so as to cool it to ambient temperature or a temperature a little thereabove.

Downstream of the heat exchanger 14 the minor air stream flows into a plant 16 for separating air by rectification. The plant may for example be of the kind described with reference to and shown in FIG. 1 of EP-A-0 384 688.

A stream of oxygen product and a stream of nitrogen product are withdrawn from the plant 16. The stream of oxygen product is compressed to a pressure of about eight bar absolute in an oxygen compressor 18. The compressed oxygen stream is used to enrich in oxygen an air blast which is supplied to a blast furnace 22.

The blast furnace 22 is used to reduce iron ore to make iron by reaction with a solid carbonaceous fuel. The necessary heat for the reaction is generated by the reaction of the oxygen enriched air with the carbonaceous fuel. As a result of the reactions that take place in the blast furnace, a gas mixture comprising carbon monoxide, hydrogen, carbon dioxide, nitrogen and argon is produced. It typically has a calorific value in the order of 3 to 5 $MJ/m^3$ depending on the degree of enrichment of the air blast. The gas mixture leaving the top of the blast furnace will also typically contain traces of oxides of sulphur and nitrogen and other undesirable gaseous substances, be laden with particulate contaminants, and be at an elevated temperature. The gas mixture is treated in a plant 24 of conventional kind to cool it to ambient temperature, and to remove undesirable gaseous impurities of particulate contaminants.

The resulting purified fuel gas stream from the plant 24 is then compressed in a compressor 26 and raised to a pressure such that it is able to enter the combustion chamber 6 at the required elevated pressure. The compressor 26 is typically provided with aftercooling means (not shown) to remove heat of compression therefrom.

If desired, not all the fuel gas leaving the clean-up plant 24 need flow to the compressor 26. Instead, some can be used for heating purposes on the site of the blast furnace 22. For example, some of the fuel gas can be burned to generate heat for preheating the air blast flowing to the blast furnace 22.

The stream of nitrogen withdrawn at pressure from the air separation plant 16 is passed into the bottom of a gas-liquid contact column 28 in which it is contacted with a downwardly flowing stream of hot water. If desired, the nitrogen stream may be further compressed upstream of the column 28 by means not shown in FIG. 1. The column includes a packing 30 to facilitate contact between the water and the nitrogen. A resulting stream of nitrogen saturated at pressure with water vapor is then passed through the heat exchanger 12 countercurrently to the minor stream of compressed air and is thereby heated to a temperature in the range of 300° to 400° C. The resulting stream of heated nitrogen is then passed into a second expansion turbine 32 and is expanded therein with the performance of external work, the turbine 32 being used to drive an alternator 33 and hence generate electrical power. The expanded nitrogen leaves the expansion turbine 32 at a pressure in the order of 1.05 atmospheres absolute.

The water supplied to the column 28 flows in a circuit in which it is pumped at a pressure in the range of 5 to 9 bar by a pump 34 through the heat exchanger 14 countercurrently to the minor air stream. The water is thereby heated to a temperature in the range of 120° to 200° C. The resulting stream of hot water is then introduced into the column 28 at a region above the packing 30. Residual hot water flows out of the bottom of the column 28 and returns to the pump 34. Make-up water is introduced into the circuit through an inlet 36 upstream of the pump 34 and mixes with the return stream of water, and thus compensates for the water vapor carried out of the column 28 in the gaseous nitrogen flow.

Figure 2:
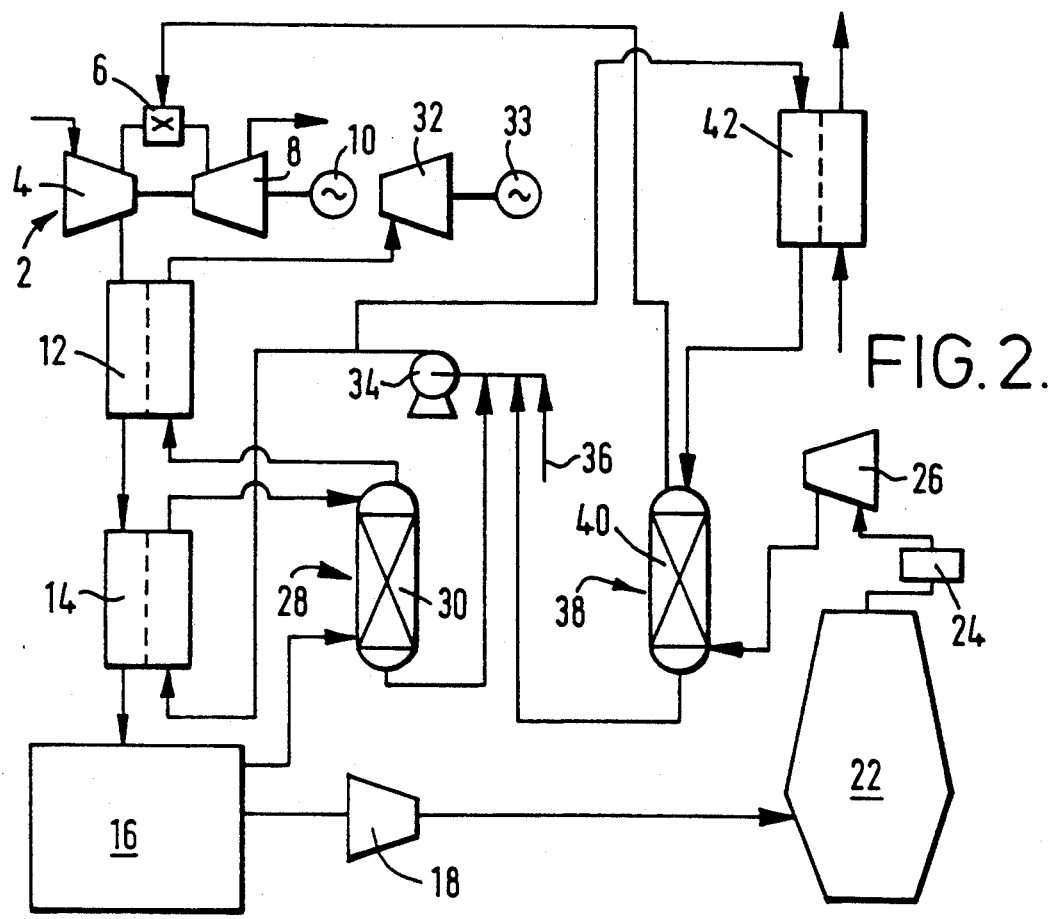
FIG. 2 is a flow diagram illustrating a second integrated plant comprising a blast furnace, a gas turbine and an air separation unit.

Referring now to FIG. 2 of the drawings, there is shown an improvement to the plant illustrated in FIG. 1. This improvement resides in the moisturization of the fuel gas intermediate the aftercooler of the compressor 26 and the combustion chamber 6 so as to enhance the generation of electrical power. In other respects the plant shown in FIG. 2 is identical to that shown in FIG. 1. Accordingly only the aforesaid improvement is described below with reference to FIG. 2. moisturization of the compressed fuel gas is performed by passing it upwardly through a second gas-liquid contact column 38 containing a packing 40 to facilitate contact between the fuel gas and a downwardly flowing stream of hot pressurized water introduced into the top of the column. The contact between the water and the fuel gas enables there to be formed a stream of fuel gas saturated in water vapor at the operating pressure of the chamber 6 and at a temperature in the range of 200° to 300° C. This saturated stream of fuel gas then flows into the combustion chamber 6 of the gas turbine 2.

Hot water flows out of the bottom of the second column 38 and is united with the stream of hot water leaving the other liquid-gas contact column 28 and a stream of make up water introduced through the inlet 36. Downstream of the pump 34 the flow of water is divided into two parts. One part is used to moisturize the stream of nitrogen as described above with reference to FIG. 1. The other part is then heated to a temperature in the range of 120° to 200° C. in a heat exchanger 42. The resulting heated water is then introduced into the top of the column 38 and is thus the source of water used to the fuel gas. The heating of the pressurized stream of water in the heat exchanger 42 is effected by virtue of the countercurrent passage therethrough of a stream of heat exchange fluid which may, for example, be taken from hot gas exiting from the expansion turbine 8.

If desired, not all the fuel gas leaving the clean-up plant 24 need flow to the compressor 26. Instead, some can be used for heating purposes on the site of the blast furnace 22. For example, some of the fuel gas can be burned to generate heat for preheating the air blast flowing to the blast furnace 22.

Figure 3:
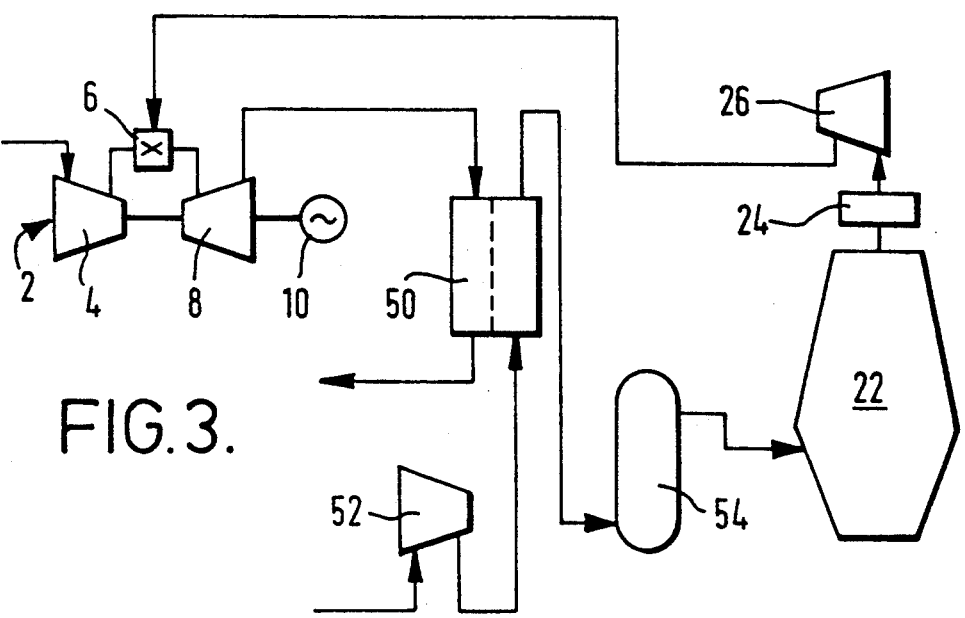
FIG. 3 is a flow diagram illustrating apparatus for utilizing a gas stream exhausted from the gas turbine shown in FIG. 1 or FIG. 2.

An alternative or additional method for preheating the air supplied to the blast furnace 36 is shown in FIG. 3.

A hot gas stream leaving the expander 8 of the gas turbine 2 at a temperature in the range of 450° to 550° C. and a pressure in the order of 1 atmosphere absolute flows into a heat exchanger 50 in which it is cooled by countercurrent heat exchange with a compressed air stream. The compressed air stream is created by operating an air compressor 52 separate from the air compressor 4 of the gas turbine 2. The air compressor 52 raises the pressure of the air to a level suitable for its introduction into the blast furnace 22. This pressure is typically in the range of 4 to 5 atmospheres absolute. This compressed air stream is heated to a temperature in the order of 500° C. by passage through the heat exchanger 50 as aforesaid. The resulting preheated air stream then flows through a series of stoves 54 in which it is heated to a temperature in the range of 1000° to 1200° C. Preheating of the air is able to make possible considerable savings in the rate at which fuel needs to be burnt in order to provide heating for the stoves. The hot air leaving the stoves is then introduced into the blast furnace 22.

Typically, approximately half the flow of exhaust gas out of the expander 8 is needed to raise the temperature of the blast air to 500° C. The remainder of the exhaust gas may for example be used for steam raising or in the heat exchanger 42 shown in FIG. 2.

It is not an essential feature of the method and plant according to the invention that the air for separation be taken as a bleed from the air compressor of a gas turbine or that cooling for the heat exchangers 12 and 14 be provided by an air stream. Indeed, by employing alternative or additional heat exchange streams, and en pressures, it is possible to enhance the degree of moisturization of the nitrogen stream (in comparison to moisturization levels achievable by operating the plants shown in FIGS. 1 and 2) and therefore to generate more power.

In an example of the operation of the plant shown in FIG. 1, a fuel gas stream is introduced into the combustion chamber 6 of the gas turbine 2 a rate of 63.3 kg/s. It has the following approximate composition by volume:

CO 26.4%; CO2 24.8%; N2 43.1%; H2 5.7%, and a calorific value of 4.2 Mi/Nm$^3$.

Air is bled from the compressor 4 of the gas turbine 2 at a rate of 43.1 kg/s. Oxygen is separated therefrom and is supplied to the blast furnace 22 from the compressor 18 at a rate of 8.7 kg/s and a pressure 8 bar. Nitrogen is separated from the air and supplied to the column 28 at a rate of 34.4 kg/s, a pressure of 4.8 bar and a temperature of 25° C. Water is added to this flow at a rate of 1.1 kg/s, the nitrogen leaving the column 28 at a temperature of about 65° C. The nitrogen stream is then heated to about 380° C. by passage through the heat exchanger 12 and enters the expansion turbine 32 at this temperature and a pressure of 4.65 bar.

The gas turbine 2 is a SIEMENS V64.3 gas turbine. It generates 59.0 MW of power. The expansion turbine 32 generates an additional 7.2 MW of power (compared with 6.8 MW if no moisturization is employed).

By using an alternative hot gas stream for heating the heat exchangers 12 and 14, it is possible to use 20 MW of heat so as to moisturize the nitrogen (introducing water into it at a rate of 8.9 kg/s) and thereby to generate 10.1 MW by operation of the expansion turbine 32. In such an example, the nitrogen stream leaves the column 28 at a temperature of 120° C. and is then heated to about 380° C. by passage through the heat exchanger 12. It enters the expansion turbine 32 at this temperature and a pressure of 4.65 bar.

I claim:

1. A method of separating air and generating power, comprising:
   a) compressing air without removing at least part of the heat of compression thereby generated to form a compressed air flow;
   b) dividing the compressed air flow into a major stream and a minor stream;
   c) cooling the compressed minor air stream by heat exchange with a pressurized stream of water;
   d) separating the minor air stream into oxygen and nitrogen;
   e) moisturizing a stream of nitrogen by introducing it into said pressurized stream of water downstream of the heat exchange between the stream of water and the minor air stream;
   f) burning a stream of low grade fuel gas utilizing said major air stream to support its combustion;
   g) expanding with the performance of external work gaseous combustion products evolved from the burning of said fuel gas, the work performed comprising the generation of a part of said power, and
   h) expanding with the performance of external work at least part of the moisturized nitrogen stream separately from the expansion of said combustion products performed comprising the generation of another part of said power.

2. The method as claimed in claim 1, in which the minor stream of air is precooled upstream of its heat exchange with the pressurized stream of water.

3. The method as claimed in claim 2, in which the heat exchange between the minor stream of air and the moisturized nitrogen heats the nitrogen to a temperature in the range of 300° to 400° C.

4. The method as claimed in claim 2, in which the precooling of the minor stream of air is effected by heat exchanging it with at least part of the moisturized stream of nitrogen.

5. The method as claimed in claim 4, in which the minor air stream is separated in an air separation unit; and the stream of nitrogen is taken at elevated pressure from said air separation unit and is not further compressed upstream of its expansion with the performance of external work.

6. The method of claimed in claim 1, in which another pressurized stream of water is also heat exchanged with the minor stream of air and is then employed to moisturize said stream of low grade fuel gas upstream of the combustion of the fuel gas.

7. The method as claimed in claim 1, in which the fuel gas is saturated with water vapor.

8. The method as claimed in claim 1, in which the low grade fuel gas stream is moisturized with the stream of pressurized water by countercurrent contact of the two streams with one another in a liquid-gas contact column.

9. The method as claimed in claim 1, in which oxygen generated by the separation of air is used in generating the low grade fuel gas.

10. The method as claimed in claim 1, in which the fuel gas is generated in the reduction in a blast furnace of iron to iron ore.

11. The method as claimed in claim 10, in which the combustion products evolved from the burning of the fuel gas are expanded in a turbine, and air supplied to the blast furnace is pre-heated by exhaust gas from the said turbine.

12. The method as claimed in claim 10, in which from 15 to 30% of the compressed air is taken for air separation.

13. An integrated method of separating air and generating power, comprising
   i) separating a compressed air stream into oxygen and nitrogen;
   ii) heating a pressurized stream of water by heat exchange with a first heat exchange stream;
   iii) moisturizing a stream of the nitrogen by introducing into it said pressurized stream of water downstream of the heat exchange with said first heat exchange stream;
   iv) heating the moisturized stream of nitrogen by heat exchange with said first heat exchange stream; and
   v) expanding with the performance of external work at least part of the moisturized nitrogen stream without pre-mixing the moisturized stream with combustion gases, the work performed comprising the generation of said power.

14. An integrated plant for separating air and generating power, comprising: means for separating air into nitrogen and oxygen; a first heat exchange for heating a pressurized stream of water; means for moisturizing a stream of said nitrogen by introducing into it the heated stream of water; a second heat exchanger for heating the moisturized stream of nitrogen; means downstream of the second heat exchanger, for expanding at least part of the heated, moisturized stream of nitrogen with the performance of external work; and power generated means adapted to be driven by the expansion means.

15. A plant for separating air and generating power, comprising: a gas turbine comprising an air compressor, combustion chamber and a first expander wherein the combustion chamber communicates with an outlet from the air compressor and has an inlet for a pressurized stream of low grade fuel gas and the first expander has an inlet communicating with an outlet from the combustion chamber for products of the combustion of the fuel gas; a heat exchanger having a first inlet communicating with an outlet from the air compressor and a second inlet communicating with a source of pressurized water, whereby in operation an air stream withdrawn from the compressor is able to be heat exchanged with a pressurized stream of water; means for separating the heat exchanged air into oxygen and nitrogen; means for moisturizing a stream of nitrogen with said heat exchanged pressurized stream of water; and power generation means adapted to be driven by the gas turbine, and a second expander separate from said first expander for expanding with the performance of external work at least part of the moisturized stream of nitrogen.

16. The plant as claimed in claim 15, additionally including another heat exchanger for precooling the stream of air upstream of the heat exchanger for heat exchanging said stream of air with said pressurized stream of water.

17. The plant as claimed in claim 16, in which said another heat exchanger is arranged for the passage therethrough of said moisturized stream of nitrogen.

18. The plant as claimed in claim 15, in which the means for separating the heat exchanged air into oxygen and nitrogen is a cryogenic air separation plant.

19. The plant as claimed in claim 15, further comprising another compressor having an aftercooler for pressurizing the low grade fuel gas thereby to form said pressurized stream of low grade fuel gas and a countercurrent liquid-contact column connected intermediate the inlet of the combustion chamber and the aftercooler for moisturizing said pressurized stream of low grade fuel gas.

20. The plant as claimed in claim 15, further comprising a blast furnace for making iron from iron ore and for generating the low grade fuel gas.

21. The plant as claimed in claim 20, in which the means for separating the air has an outlet for oxygen communicating with the blast furnace.

22. The plant as claimed in claim 20, in which there is an additional heat exchanger for pre-heating air supplied to the blast furnace by heat exchange with exhaust gas from said gas turbine.

* * * * *